US012700937B1

(12) United States Patent
Levy et al.

(10) Patent No.: US 12,700,937 B1
(45) Date of Patent: Aug. 4, 2026

(54) DOCSIS R-PHY WITHOUT PTP

(71) Applicant: Harmonic, Inc., San Jose, CA (US)

(72) Inventors: Adam Levy, Pardes Hana-Karkur (IL);
Gidon Maister, Haifa (IL); **Andrii
Shevchenko, Kyiv (UA); Oleksandr
Zolotarov, Kyiv (UA); Eyal Galin**,
Pardes Hanna-Karkur (IL)

(73) Assignee: Harmonic, Inc., San Jose, CA (US)

( * ) Notice: Subject to any disclaimer, the term of this
patent is extended or adjusted under 35
U.S.C. 154(b) by 326 days.

(21) Appl. No.: 18/387,369

(22) Filed: Nov. 6, 2023

Related U.S. Application Data

(60) Provisional application No. 63/423,720, filed on Nov.
8, 2022.

(51) Int. Cl.
H04J 3/06 (2006.01)
H04L 12/28 (2006.01)

(52) U.S. Cl.
CPC ........ H04J 3/0658 (2013.01); H04L 12/2801
(2013.01)

(58) Field of Classification Search
CPC ........................... H04J 3/0658; H04L 12/2801
See application file for complete search history.

(56) References Cited

U.S. PATENT DOCUMENTS

| 2002/0167942 | A1* | 11/2002 | Fulton | G06F 11/3419 |
| | | | | 370/352 |
| 2020/0195362 | A1* | 6/2020 | Neugeboren | H04J 3/0661 |
| 2021/0152386 | A1* | 5/2021 | Chari | H04L 12/2856 |
| 2021/0160091 | A1* | 5/2021 | Foley | H04J 3/0682 |

OTHER PUBLICATIONS

Cable Television Laboratories Inc., Remote DOCSIS Timing Inter-
face, Jan. 11, 2017, CableLabs, CM-SP-R-DTI-I04-170111, p. 16
(Year: 2017).*
Cable Television Laboratories, Data-Over-Cable Service Interface
Specifications DCA-MHAv2: Remote DOCSIS Timing Interface,
Jan. 11, 2017, CableLabs, CM-SP-R-DTI-I04-170111 (Year: 2017).*

* cited by examiner

*Primary Examiner* — Edan Orgad
*Assistant Examiner* — Samuel Roberge Bettendorf
(74) *Attorney, Agent, or Firm* — Brokaw Patent Law, PC;
Christopher J. Brokaw

(57) ABSTRACT

Synchronizing clocks across a Remote PHY network with-
out use of the Precision Time Protocol (PTP). The clock used
by the CCAP core may be referred to herein as a slave clock,
while the clock used by each RPD may be referred to as a
master clock. Time differences between each master clock
and a slave clock in the Remote PHY network are tracked.
Slave clocks at the core may, but need not, lock to a single
RPD master clock. A CCAP core tracks differences in clock
values between a singular CCAP core clock and one or more
RPD clocks using clock values identified by received DEPI
Latency Measurement (DLM) packets and not using Preci-
sion Time Protocol (PTP) protocol. The CCAP core deter-
mines a particular RPD clock value to use in sending a map
message to a particular RPD. The CCAP core then sends a
map message to the particular RPD over the network based
on the determined particular RPD clock value.

24 Claims, 5 Drawing Sheets

TRACK DIFFERENCES BETWEEN CLOCK VALUES OF ONE OR MORE MASTER CLOCKS AND A SLAVE CLOCK ACROSS A NETWORK — 210

DETERMINE A MASTER CLOCK VALUE TO USE IN SENDING A MAP MESSAGE — 220

SEND THE MAP MESSAGE OVER THE NETWORK FROM THE CCAP CORE TO A PARTICULAR RPD — 230

Using DLM to Estimate RPD Phase and Calculate CIN Latency

CIN Latency L = ((T4-T1)/2)
- optionally subtract hardcoded RPD DLM processing (T3-T2)
- calculated based on Core Clock
- latency used for map-advance calculations RPD phase sample S = T2 + L
- Input sample S into PLL/algorithm that track RPD time
- minimize error (expected S vs received S)

RPD

CORE

T1

T4

T2
T3

DLM-EI-RQ

DLM-EI-RP

310

320

DOCSIS R-PHY WITHOUT PTP

CLAIM OF PRIORITY

The present application claims priority to U.S. Provisional Patent Application No. 63/423,720, filed on Nov. 8, 2022, entitled 'DOCSIS R-PHY Without PTP,' the entire contents of which are incorporated by reference for all purposes as if fully set forth herein.

FIELD OF THE INVENTION

Embodiments of the invention relate to synchronizing clocks across a Remote PHY network without use of the Precision Time Protocol (PTP).

BACKGROUND

A leading cause of operational issues within a cable network is deployment issues pertaining to Precision Time Protocol (PTP), which is a protocol used to synchronize the clocks of computers and nodes within the cable television network. At present, there is a need to synchronize the clock used at the cable headend with other clocks dispersed throughout the network, e.g., clocks used by Remote PHY devices. This need arises mainly to control the upstream medium access.

The PTP 1588 protocol (PTP) is specified by the Institute of Electrical and Electronics Engineers (IEEE) and is used for synchronizing clocks in the DOCSIS core with Remote PHY nodes in a Distributed Access Architecture (DAA) network. The DOCSIS core schedules DOCSIS upstream channels using map messages, which are generated by the DOCSIS core and provided to cable modems. The cable modems use the map messages sent by the DOCSIS core to be informed of when they are allowed to communicate upstream (i.e., in the direction from the cable modem to the cable headend). The time slot granted by the DOCSIS to a particular party for communicating upstream over a particular upstream channel typically has a resolution or magnitude of some number of micro-seconds. A Remote PHY device uses the same map messages to configure its burst receiver with expected burst patterns and modulations in each time slot so that the Remote PHY device can demodulate the information from the signal.

Implementing PTP in a real-world cable television network deployment is difficult as a wide variety of field issues may cause bugs or functional issues to arise. Indeed, a cable television provider might experience hundreds of issues to resolve each day related to PTP. In addition, operators are required to purchase expensive equipment, such as grand masters (GMs) and boundary clocks (BCs), as well as maintain human expertise within the organization about timing issues around the cable network. Maintaining such equipment and expertise is very expensive.

In the prior art, certain clocks across a cable television network may have been synchronized using timestamps generated from hardware. For example, an integrated micro-chip provided by Broadcom, Inc. of San Jose, California can be configured to send a timing packet at regular intervals. This timing packet may be used to notify a CCAP core of a timestamp that reflects a certain time at an R-PHY device. The CCAP core may use this information to synchronize its clock to the clock used by the R-PHY device using a phased lock loop (PLL). However, not all R-PHY devices support a hardware-generated timestamp of this nature and there is no standard method to enable such a hardware-generated timestamp.

An industry recognized specification from CableLabs, Inc. of Louisville, Colorado named R-DTI defines certain timing interfaces between a RPD and the CCAP core. These timing interfaces require the use of the PTP 1588 protocol. Section 5.4.2 of the R-DTI specification defines a node master mode wherein a RPD operates as a master and the CCAP core operates as a slave. In the node master mode, the RPD also acts as a 1588 PTP Grand Master (GM). Section 5.4.2.3 of the R-DTI specification describes that both node master node and node slave mode may be used by a single Cable Modem Termination System (CMTS). Section 5.4.1.2 of the R-DTI specification describes DLM utilization for latency measurement in node slave mode, but there is no discussion for DLM utilization for latency measurement for node master node under section 5.4.2.

Section 5.4.2.3 of the R-DTI specification describes that for a RPD to support node master node, the RPD must support 1588 OC grandmaster and may optionally support 1588 BC. Section 5.4.2.3 of the R-DTI specification also describes that when a CCAP core operates in node master mode, the CCAP core must (1) support 1588 OC slaves to multiple 1588 clock domains, (2) generate MAPs based on the DOCSIS times of the individual 1588 clock domains which are owned by the individual RPDs, and (3) time/phase synchronization between the RPD and the CCAP core must be within 1 msec.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Embodiments are directed towards synchronizing a clock used at a cable headend with clocks used at one or more remote-PHY devices (RPDs) without reliance on the Precision Timing Protocol (PTP) protocol. In the following description, for the purposes of providing a detailed explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

The clock used by the CCAP core may be referred to herein as a slave clock or a core clock, while the clock used by each RPD may be referred to herein as a master clock or a RPD clock. A typical embodiment comprises a large number of RPDs while only one CCAP core. Thus, embodiments may be used to separately synchronize the CCAP core to each RPD clock without using the PTP protocol, even though each RPD clock may operate at a different rate and phase. As understood to those in the art, master clocks and slave clocks in this technical context measure logical time as opposed to wall-clock time. Embodiments of the invention enable the slave clock used by a CCAP core to lock to each of the master clocks used by a RPDs or RPNs through the network separately.

Figure 1:
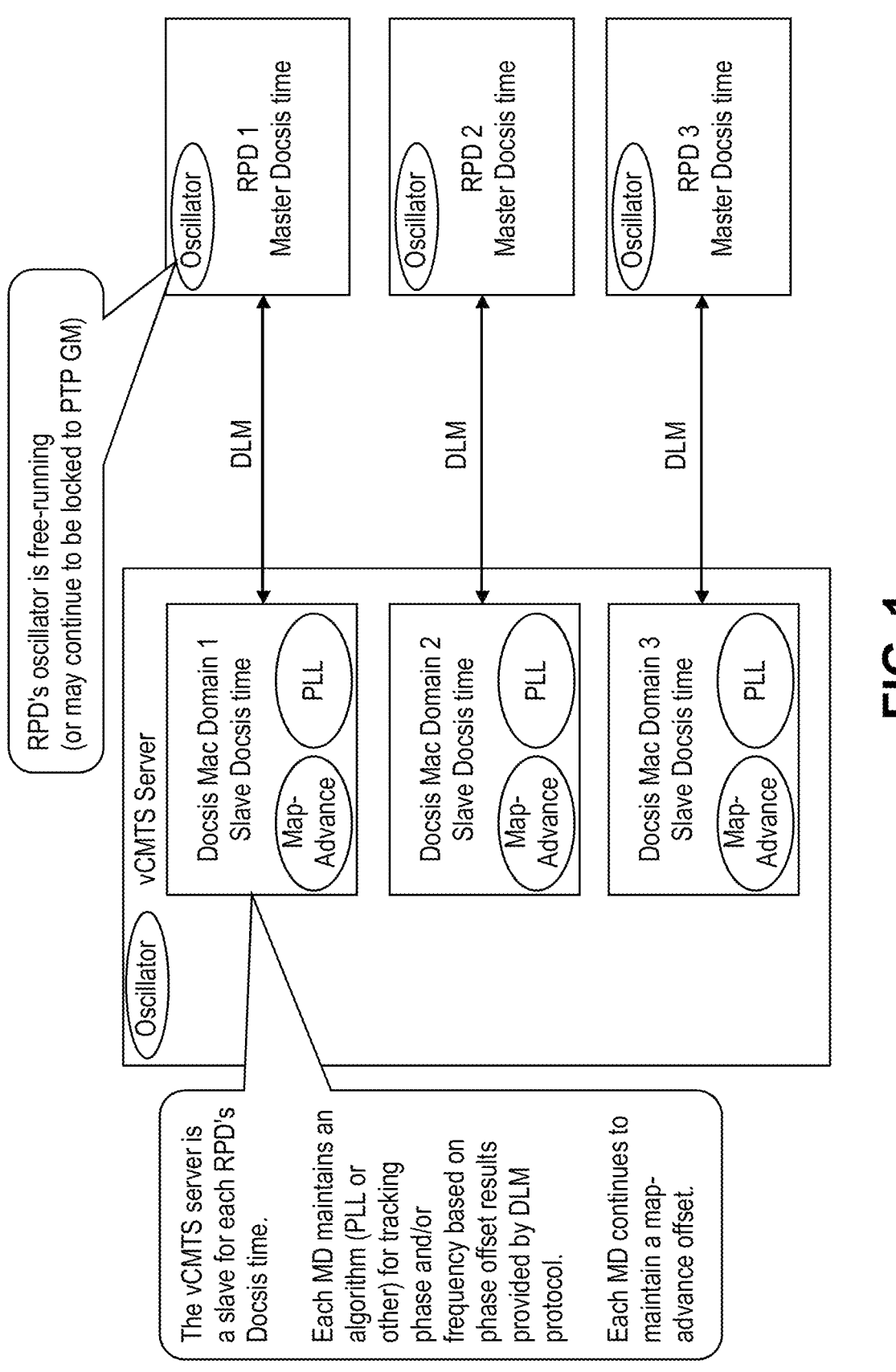
FIG. 1 is a diagram of a Remote PHY network which synchronizing clocks throughout the network without use of the Precision Time Protocol (PTP) in accordance with an embodiment of the invention.

Each entity in a system of an embodiment of the invention has its own hardware (HW) clock. In an embodiment involving a cable network, the CCAP core has its own HW clock, each server has its own HW clock, and each RPD has its own HW clock. Each clock may have a different rate (frequency) and phase. In embodiments of the invention, the CCAP core implements a phase lock loop (PLL) or other software-based mechanisms to track each of a plurality of RPD clocks, each of which is treated as the master DOCSIS time for all DOCSIS purposes. Embodiments of the invention may track the phase of a RPD clock along with the network latency to that RPD clock. Embodiments of the invention may also track the frequency of a RPD clock in addition to tracking the phase and network latency for that RPD clock. FIG. 1 is a diagram of a Remote PHY network which synchronizes clocks throughout the network without use of the Precision Time Protocol (PTP) in accordance with an embodiment of the invention. FIG. 1 depicts a virtual Cable Modem Terminal System (abbreviated as vCMTS) whose operational behavior are implemented entirely in software capable of executing on general purpose hardware. The vCMTS of FIG. 1 executes on general purpose hardware that possesses its own HW clock, which is represented in FIG. 1 by the oscillator. The vCMTS employs a phase lock loop (PLL) or other software-based mechanisms to track each RPD clock. Each PLL, or other software-based mechanism, learns a ratio between the CCAP core HW clock (i.e., the HW clock upon which the vCMTS executes) and a particular HW clock of a RPD such that a formula may extrapolate the current RPD time from the core HW clock.

Embodiments shall be discussed herein involving a PLL, or other such software-based mechanism, at the CCAP core locking to the RPD clock and considering the network latency separately as a different component. Other embodiments shall be discussed herein involving a PLL, or other such software-based mechanism, at the CCAP core locking to the RPD clock and considering the network latency together with the clock differences in an integrated fashion together.

While embodiments shall chiefly be described with reference to concrete examples in the technical context of a cable network comprising a CCAP core, which may include a CMTS or a vCMTS, and a plurality of cable nodes, such as Remote PHY Node (RPN) that comprises one or more Remote PHY devices (RPD) and/or a Remote MACPHY node (RMN) that comprises one or more Remote MACPHY devices (RMD), the principles and approaches discussed herein may be applied in other technical contexts and Distributed Access Architectures (DAAs). Thus, embodiments of the invention are not limited to any technical context and may be used outside of a cable network, e.g., embodiments may be employed within a mobile network. For this reason, embodiments may be used with a variety of other types of master clocks and slave clocks than a RPD clock and a CCAP core clock respectively.

In a Converged Cable Access Platform (CCAP), the CCAP core generates map messages and provides them to cable modems (CMs) to inform them of time windows in which they are allowed to transmit in an upstream direction (that is to say, in the direction from the CM to the CCAP core). A Remote PHY device uses the same map messages provided by the CCAP core to configure its burst receiver with the expected burst patterns and modulations in each time slot so it can demodulate the information from the signal. The window of time (called a 'minislot') defined by a map message is typically for a certain number of microseconds.

While the accuracy between the locking of the clock used by a burst receiver and by a cable modem should be accurate, the accuracy of the locking between the clock used by the upstream scheduler and the RPD clock may be relatively less precise and need be accurate only to the millisecond. Embodiments of the invention advantageously leverage the difference between the relatively higher precision timing requirements between CM and burst receiver in locking to DOCSIS time clock with the relatively lower precision timing requirements of an upstream scheduler in locking to the DOCSIS time clock to perform map scheduling without reliance upon the Precision Timing Protocol (PTP).

Embodiments of the invention enable the CCAP to perform shallow tracking of RPD clocks. By this what is meant is that the CCAP core must ensure that a map message sent to a RPD must identify a timeslot that is in the future as measured by that RPD and not "in its past." However, this may be accomplished without the CCAP core being locked to the RPD clock in the same precision as the RPD clock is locked to the clock used by the cable modem it services, and thus, the CCAP core may perform "shallow tracking" of the RPD clock.

DEPI Latency Measurement (DLM) is used by the prior art for measuring the network latency between the CCAP core and a particular RPD. DLM is specified in the Remote Downstream External PHY Interface Specification (the "DLM specification") by CableLabs Inc. of Louisville, Colorado. The DLM specification defines certain messages as a request (abbreviated RQ) and a response (RP). The DLM specification further defines certain messages with respect to whether the message is arriving at a RPD (termed ingress) or leaving a RPD (termed egress) using the notation: DLM-EI-RQ to refer to a DLM request message that is arriving at a RPD, DLM-EI-RP to refer to a DLM response message that is arriving at a RPD, DLM-EE-RQ to refer to a DLM request message that is leaving a RPD, and DLM-EE-RP to refer to a DLM response message that is leaving a RPD. Embodiments of the invention shall be described herein which use the DLM-EI-RQ and DLM-EI-RP messages; however, other embodiments of the invention may use other latency measurement messages, such as but not limited to DLM-EE-RQ and DLM-EE-RP.

At present, the DLM protocol is used to measure network latency by the present state of the art. To use a DLM data packet to measure network latency per the Remote PHY protocol, the CCAP core sends a data packet with a timestamp of its clock (the core clock) to an RPD. In turn, the RPD replies with a response packet to the received DLM data packet. The response packet sent by the RPD to the CCAP core comprises its own timestamp, measured by its own clock (the RPD clock) in addition to the received timestamp of the CCAP core. The CCAP core uses the data carried by response packet sent by the RPD to calculate the network delay between the CCAP core and that RPD by subtracting the time stamp of the RPD from the timestamp of the CCAP core. This approach of the prior art assumes and requires that the CCAP core and the RPD both operate in the same time domain, i.e., the timestamps of the RPD and the CCAP core are capable of being meaningfully compared to each other.

Functional Overview

Certain embodiments of the invention use the DLM protocol in a new and entirely different manner than intended and/or used by the prior art. Specifically, embodiments of the invention use DLM messages to track the clock at a particular location, determine latency across a Distributed Access Architecture (DAA) to that location, and/or determine the required map-advance\map-lead-time in generating map messages set to that location.

Figure 2:
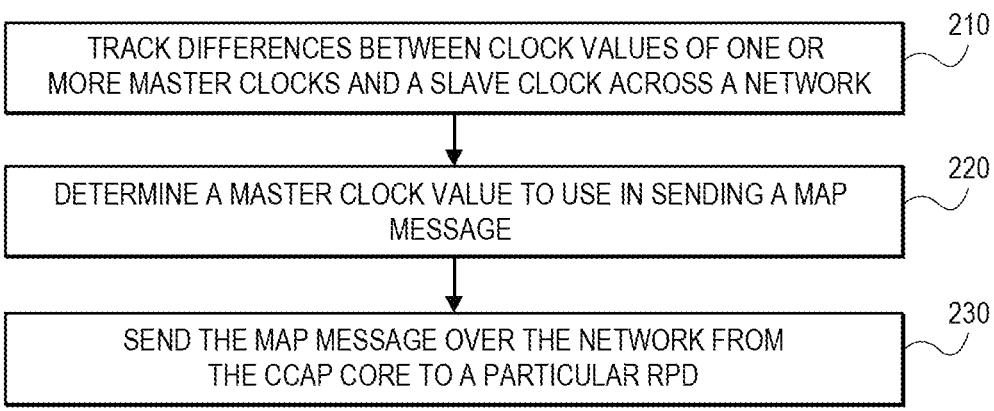
FIG. 2 is a flowchart depicting the high-level functional steps of an embodiment in accordance with an embodiment of the invention.

FIG. 2 is a flowchart depicting the high-level functional steps of an embodiment in accordance with an embodiment of the invention. In step 210, differences between clock values of a core clock (or slave clock) and one or more RPD clocks (or master clocks) are tracked using the DLM protocol. As there are multiple RPDs clocks, the differences between each RPD clock and the core clock are tracked at the CCAP core. These differences may be tracked at the CCAP core using a variety of different mechanisms, such as a separate phase lock loop (PLL) for each master clock, and shall be described in greater detail below.

The tracking of differences between the plurality of RPD clocks and the core clock is performed using clock values identified by received DEPI Latency Measurement (DLM) packets and is not performed using the Precision Time Protocol (PTP). The DLM protocol is used continuously in various intervals (such as, for example, 10 times a second) to lock the core clock to a particular RPD clock. Thereafter, in step 220, a master clock value is determined for a particular RPD using the tracked differences in step 210. A measurement of the network latency between that particular RPD and the CCAP core may be considered. Various embodiments will be discussed below for considering network latency in different ways.

Finally, in step 230, the CCAP core sends a map message over the network to the particular RPD based on the clock value determined in step 220. The map message sent over the network in step 230 identifies the required map-advance\map-lead-time for the particular RPD to which the map message is sent. In step 230, map messages are generated and sent in different intervals, such as 250 times a second to provide an illustrative, non-limiting example. Map messages may be sent in step 230 after a PLL at the CCAP core is locked to a particular RPD.

The steps of FIG. 2 may be performed by a CCAP core by an embodiment of the invention, thereby allowing the CCAP core to track individual clock values of a plurality of RPDs. The timing constraints for the clock used by a typical RPD are stricter than that of the clock used by the CCAP core. For this reason, the CCAP core may use the approach shown in FIG. 2, discussed in greater detail below, to track the clock used by one or more RPDs and make suitable adjustments as necessary, as the timing constraints for a logical clock maintained at the CCAP core are accommodating enough to allow time to do so. Indeed, the RPD clock tracking which is performed at the CCAP core might be relatively shallow and allow for phase jumps and inaccurate frequency locking, or even no frequency lock at all.

In the approach of FIG. 2, there is no expectation that the clocks at both the core and the RPD are locking to the same clock, such as a PTP GM. Therefore, the DLM protocol is used to track not just latency and minor phase differences, but to track the RPD DOCSIS time phase. Recall that DLM, as used in the prior art, does assume that the clocks at both the core and the RPD are locked to a PTP GM. However, embodiments make no such assumptions, and so there may be large differences between the time values carried by the DLM packets. As DOCSIS measures time using measures that repeat every 7 minutes, so there could be minutes of phase difference.

Having described a high-level overview of embodiments of the invention, additional details will now be discussed regarding how the clocks used by RPDs across the network may be tracked by the CCAP core.

Use of DLM Messages to Estimate Phase and Calculate Cin Latency

Figure 3:
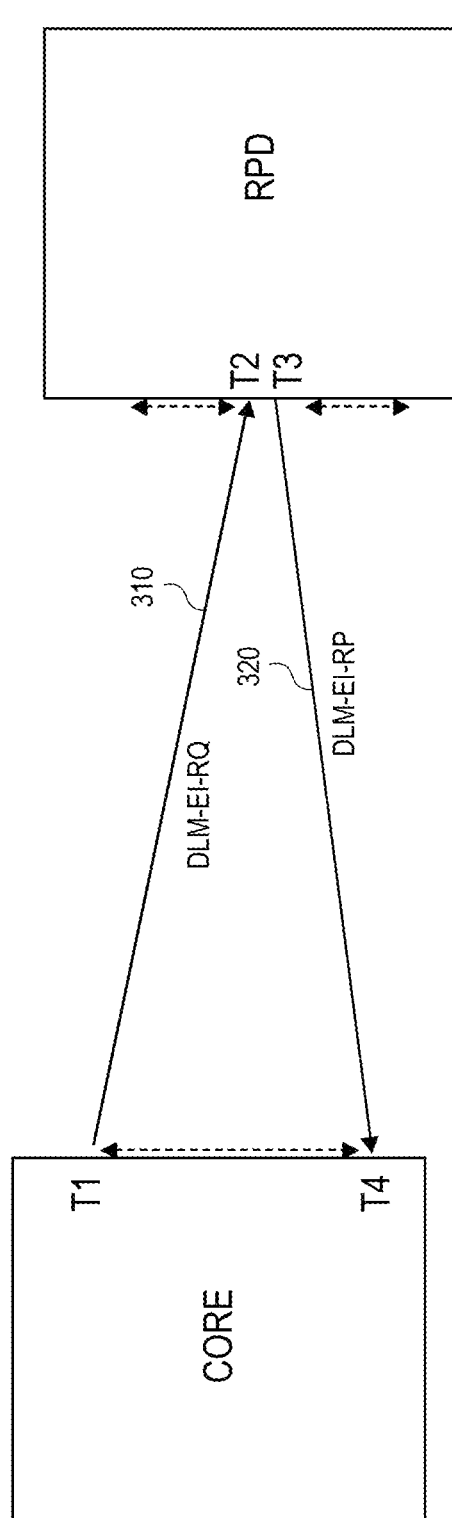
FIG. 3 is a sequence diagram that illustrates an approach that uses a single DLM message to estimate the phase of a clock at a RPD and calculate the network latency between the CCAP core and that RPD using a core clock in accordance with an embodiment of the invention.

Embodiments of the invention may employ several different approaches for performing the steps of FIG. 2. FIG. 3 is a sequence diagram that illustrates one such approach that uses DLM messages to estimate the phase of a clock at a RPD and calculate the network latency between the CCAP core and that RPD in accordance with an embodiment of the invention. In FIG. 3, the times T1 and T4 are expressed using the core clock, whereas the times T2 and T3 are expressed using the RPD clock. The times T4 and T1 are used to estimate the latency of the network using the time domain of the core clock. This latency may also be used in calculating the map-advance. As described in more detail below, a PLL, or the like, at the CCAP core may track the RPD clock based on T2 samples and latency estimations.

As shown in FIG. 3, initially, at time T1, the CCAP core sends a DLM packet to an RPD, which is represented by route 310. As shown in FIG. 3, that DLM packet may correspond to a DLM-EI-RQ message. Each DLM packet contains various fields to identify a start time and an end time, both of which may be set at various times. At time T1, the field of the DLM packet, represented by route 310, that identifies a start time is written to by the CCAP core to identify the time at which the CCAP core sent the DLM packet, and the field of the DLM packet, sent over route 310, that identifies an end time is not yet used or assigned meaningful data by the CCAP core. The start time may be expressed using the CCAP core clock or the clock employed by a phase lock loop (PLL) or the like. Thereafter, at time T2, the RPD receives the DLM packet sent by the CCAP core over route 310.

After the RPD receives the DLM packet sent over route 310 at time T2, a certain amount of time elapses and then the RPD sends a response DLM packet, represented in FIG. 3 as route 320, to the received DLM packet at time T3, as per the DLM protocol. As shown in FIG. 3, this response DLM packet may correspond to a DLM-EI-RP message. When doing so, the RPD maintains the same data in the field of the response DLM packet that identifies a start time, so that the start time field continues to identify the time at which CCAP core sent the DLM packet sent over route 310 as expressed in the clock of the CCAP core. Also, in the response DLM packet sent over route 320, the RPD assigns to the field of the response DLM packet that identifies an end time the time at which RPD received the DLM packet as expressed in the clock used by the RPD. Note that the start time identified by the response DLM packet sent over route 320 may be expressed as a clock value in the domain of the CCAP core or expressed as a PLL value, while the end time identified by the response DLM packet sent over route 320 is expressed as a clock value in the domain of the RPD.

The time T4 depicted in FIG. 3 represents the time at which the CCAP core receives the response DLM packet sent over route 320. After the CCAP core receives the response DLM packet sent over route 320, the CCAP core calculates the network latency over the Converged Interconnect Network (CIN) between itself and the RPD. The CIN is the network between the CCAP core and the RPD, including outside plant and in-hub connectivity. The CIN latency may be determined by the CCAP core as:

$$((T4-T1)/2)-\text{PROCESSING TIME OF RPD}$$

which is the value of times T4 less the value of times T1 (both expressed using the same clock, namely that of the CCAP core), the result of which is divided by 2. The value of time T4 less the value of time T1 is divided by two to account for the round trip between the CCAP core and the RPD, as the CIN latency is assumed or estimated to be double a one-way trip between the CCAP core and the RPD.

The equation above depicts a fixed value named 'PROCESSING TIME OF RPD. This fixed value represents a certain amount of time, as measured in the clock of the CCAP core, to account for the time it takes for RPD to process the DLM packet sent over route 310 before the RPD can send a response packet over route 320. Thus, PROCESSING TIME OF RPD in the equation above represents an estimate of the time T3-T2 as expressed in the clock of the CCAP core. Thus, after obtaining the value of ((T4−T1)/2), the fixed amount of time represented by PROCESSING TIME OF RPD (or the estimate of T3-T2 as expressed in the clock of the CCAP core) is subjected to obtain a measure of the CIN latency as measured in the clock of the CCAP core using a single DLM packet sent over route 310 and a single response DLM packet sent over route 320.

Certain embodiments may calculate or estimate the CIN latency without consideration of the fixed amount of time represented by PROCESSING TIME OF RPD. In such embodiments, the CIN latency may be determined by the CCAP core by ((T4−T1)/2).

The estimated phase of the RPD may be determined by the CCAP core by obtaining the time T2, which was identified by the response DLM packet sent over route 320 by RPD to the CCAP core, and adding to the time T2 the calculated CIN latency. Certain embodiments may optionally add the fixed amount of time PROCESSING TIME OF RPD, which is to account for the time it takes for RPD to process the DLM packet sent over route 310 before the RPD can send a response packet over route 320, to the sum of the time T2 and the calculated CIN latency when estimating the phase of the RPD.

The estimated phase of the RPD is provided by the CCAP core to the particular PLL that is associated with that RPD to track the clock of the RPD as part of step 310 shown in FIG. 3. As understood to those in the art, a typical cable network will contain a large number of RPDs. While FIG. 3 depicts a single RPD, the process shown in FIG. 3 and explained herein may be repeated for each RPD in the cable network.

Periodically Measuring Network Latency

In embodiments, measuring or estimated the latency of the network is performed periodically. The latency estimation between RPDs and the CCAP core may be recalibrated periodically according to various approaches across embodiments. In one embodiment, the latency estimation may be recalibrated every time a DLM response packet is received. In other embodiments, different intervals between recalibration may be used. For example, the latency may be rehabilitated periodically over many times (for example, about 10) every second to once every 10-15 seconds for a particular RPD. If there is a sudden increase in network latency between the CCAP core and a particular RPD, then the CCAP core will respond by adjusting the MAP messages for that RPD to accommodate the increased latency.

Use of Two Consecutive DLM Message to Resolve Time Differences

Figure 4:
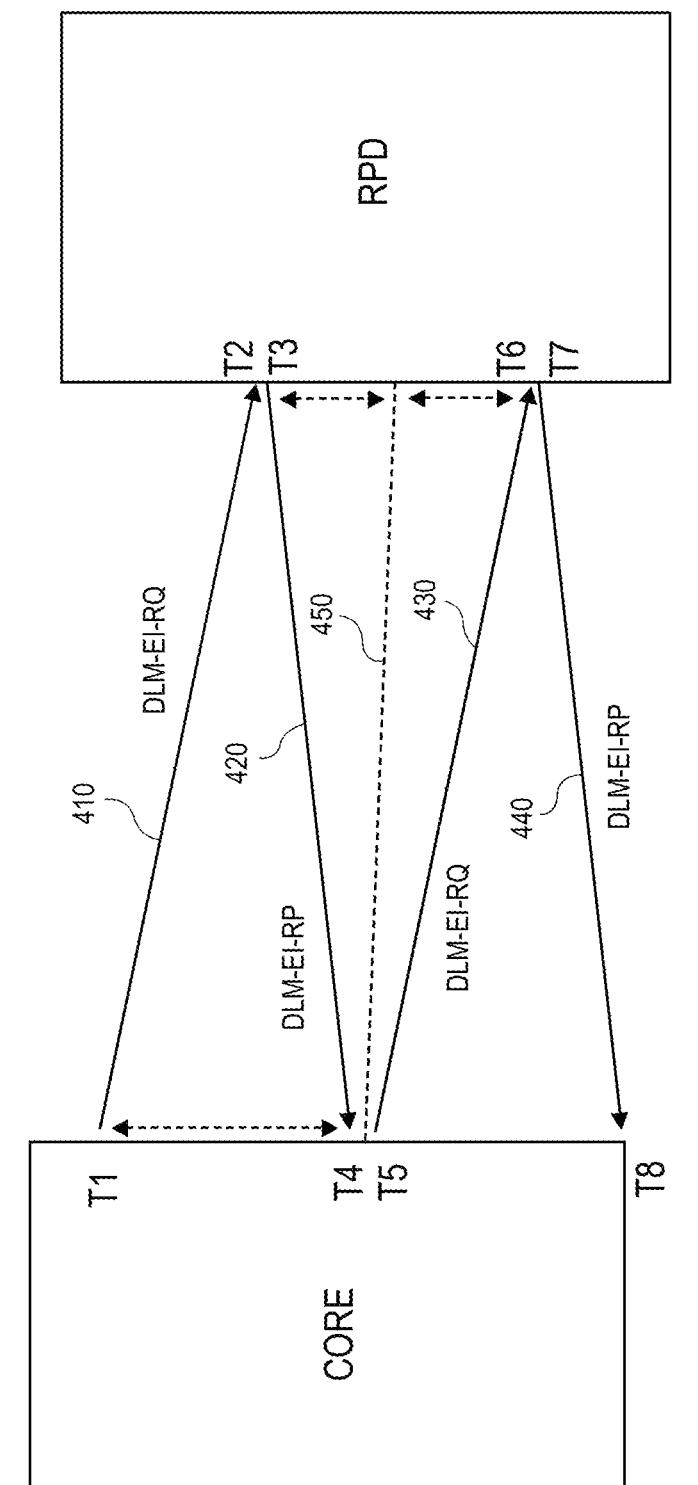
FIG. 4 is a sequence diagram that illustrates an approach that employs using two consecutive DLM messages to calculate network latency using the RPD clock in accordance with an embodiment of the invention.

FIG. 4 is a sequence diagram that illustrates an approach that employs using two consecutive DLM messages to calculate network latency using the RPD clock in accordance with an embodiment of the invention. While the approach shown in FIG. 3 relied only upon the CCAP core clock in calculating CIN latency and the estimated phase of the RPD, the approach shown in FIG. 4 relies only upon the RPD clock in calculating CIN latency.

In FIG. 4, the times T1, T4, T5, and T8 are expressed using the core clock, whereas the times T2, T3, T6, and T7 are expressed using the RPD clock. As shown in FIG. 4, the CCAP core sends the first of two consecutive DLM packets to RPD at time T1 over route 410, which is received by the RPD at time T2. This DLM packet is shown in FIG. 4 as DLM-EI-RQ. After a certain amount of time for the RPD to process the received DLM packet received at time T2, at time T3 the RPD sends an acknowledgment DLM packet, shown in FIG. 4 as DLM-EI-RP, to the CCAP core over route 420. At time T4, the CCAP core receives the acknowledgment DLM packet sent over route 420. Dotted line 450 depicts the demarcation of the two consequence DLM packets. The CCAP core sends the second of two consecutive DLM packets to RPD at time T5 over route 430, which is received by the RPD at time T6. This DLM packet is shown in FIG. 4 as DLM-EI-RQ. After a certain amount of time for the RPD to process the received DLM packet received at time T6, at time T7 the RPD sends an acknowledgment DLM packet, shown in FIG. 4 as DLM-EI-RP, to the CCAP core over route 440. At time T8, the CCAP core receives the acknowledgment DLM packet sent over route 440.

The approach shown in FIG. 4 relies upon the RPD receiving two consecutive DLM packets. The CCAP core may calculate the CIN latency in the approach of FIG. 4 by subtracting the value of time T2 from the value of time T6 (both of which are expressed in the clock of the RPD), and thereafter dividing the result by two to account for the round trip between the CCAP core and the RPD, as the CIN latency is assumed or estimated to be double a one-way trip between the CCAP core and the RPD. Thus, in the approach of FIG. 4, CIN latency is determined as: (T6-T2)/2.

Certain embodiments may use a fixed value named 'PROCESSING TIME OF RPD AND CCAP CORE.' This fixed value represents a certain amount of time, as measured in the clock of RPD, to account for the time it takes for RPD to process the response DLM packet sent over route 420 and the time it takes for CCAP core to process the second consecutive DLM packet sent over route 430. Thus, PRO-CESSING TIME OF RPD AND CCAP CORE represents an estimate of the time (T3–T2)+(T5–T4) as expressed using the RPD clock. In this embodiment, the fixed value PRO-CESSING TIME OF RPD AND CCAP CORE is an estimate, not a measurement, and is expressed in time as measured by the clock of the RPD. Using the PROCESSING TIME OF RPD AND CCAP CORE is optional, as other embodiments may not account for this time. To account for the PROCESSING TIME OF RPD AND CCAP CORE time estimate, the amount of time represented thereby is sub-tracted from the result of (T6-T2)/2. Advantageously, the embodiment of FIG. 4 enables the CCAP core to estimate the CIN latency without reference to clock values of the CCAP.

Measuring Phase Offset and Latency Using Combined Offset

An embodiment of the invention, referred to herein as the combined offset approach, extends the approach described above with respect to FIG. 3. In the combined offset approach, DLM messages are used by the CCAP core to measure combined phase and latency offsets. A combined phase and latency offset is equal to values of T2-T1. The combined phase and latency offset is used as input to the PLL or alternate algorithm maintained by the CCAP core for a particular RPD. In the combined offset approach, as with the other embodiments discussed herein, there is no expec-tation that either the CCAP core or the RPD is locked to an external PTP clock.

Embodiments employing the combined offset approach may use the single offset in different ways. One embodiment employing the combined offset approach may use the single offset as a "map advance" or in the calculation of a "map advance." For example, an implementation may establish RPD map-advance=MAX (combined offset sample in the last N seconds/minutes), so that the map-advance is the maximum difference between the clocks, which is done in order to handle jitter on the network.

Another embodiment employing the combined offset approach may input the single offsets in a PLL to track the time when maps are expected to arrive at the RPD device. This approach does so by observing the combination of the time at the CCAP core and the combined offset, i.e., the difference between the clocks at the CCAP core and the RPD and the latency between the two. For example, F could be a PLL that takes the values core time and combined offset as samples to continuously track or estimate the time maps will reach the RPD. The PLL phase and frequency, together with the map-advance, will be corrected based on the error between the projected time and the received combined offset sample. In this way, the combined offset approach may input the single offsets in a PLL to track when MAPs need to be generated to arrive at the RPD in time.

Figure 5:
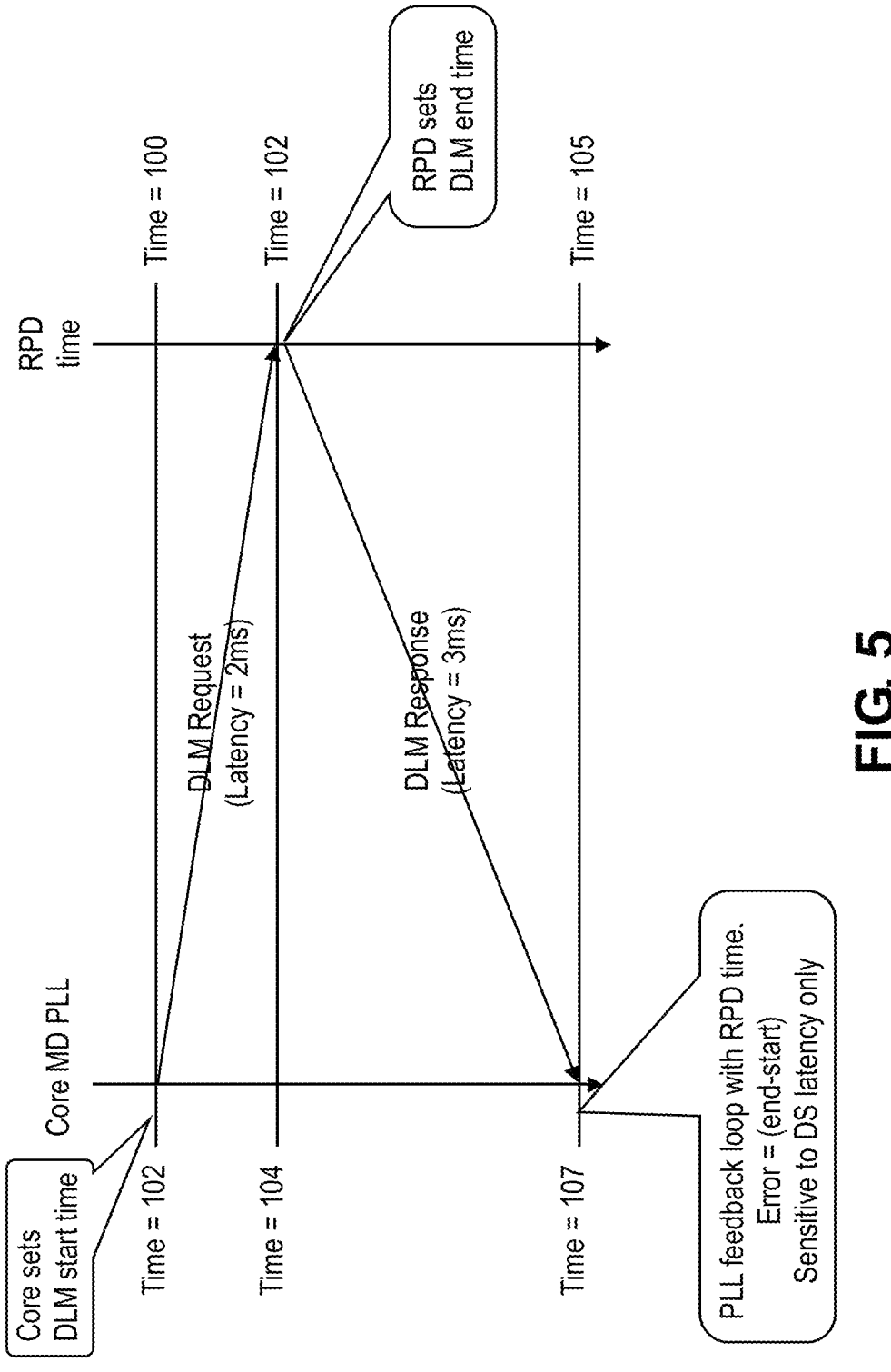
FIG. 5 is an illustration of how the combined offset approach of an embodiment of the invention may be used to track the time observed at a particular RPD in consideration of the asymmetric latency between the CCAP and that RPD.

FIG. 5 is an illustration of how the combined offset approach of an embodiment of the invention may be used to track the time observed at a particular RPD in consideration of the asymmetric latency between the CCAP and that RPD. The combined phase offset and latency that is not sensitive to asymmetry in accordance with an embodiment of the invention. In aforementioned embodiments, the network latency estimation is based on the time of (Request+Reply)/2, which means that if the latency is different in the upstream and the downstream directions, the estimation of the network latency would not identify it as such, as an assumption is made that the latency is identical in both the upstream and downstream directions. Precision Time Protocol (PTP) is sensitive to asymmetric network latency differences in the upstream and downstream directions, as such asymmetries can result in phase offset between the grandmaster (GM) and a PTP client.

In the approach depicted in FIG. 5, clock phase offset and latency are handled as one single offset that is based on the downstream direction (i.e., the direction from the CCAP core to the RPD) only. As a result, if the upstream direction (i.e., the direction from the RPD to the CCAP core) has a different latency than the downstream direction, there is no negative impact, i.e., no phase offset results.

Network latency in the downstream direction matters greatly for DOCSIS because of maps. While upstream network latency may impact subscriber experience, the system operation is not dependent on its accurate calcula-tion. As a result, the approach of FIG. 5 is feasible and provides a high robustness. The approach of FIG. 5 thus provides a significant advantage over PTP, as there is no way for PTP to resolve asymmetry in network latency with respect to upstream/downstream directions, as it is assumed in PTP that both the upstream and downstream directions are experiencing identical network latency.

High Availability

Embodiments may be configured to ensure that a High Availability (HA) software instance is maintained and avail-able if need be. To do so, the steps of FIG. 2 may be performed on any type of active and standby software components, such as for example active and standby Kuber-netes pods or software instance. In this way, embodiments may synchronize time between two software components on different servers in a cluster. Thus, the active software component would be associated with the master clock, and the standby software component would be associated with the slave clock. As a result, the clock of the standby pod would become locked to the clock of the active pod without use of the PTP protocol.

In embodiments designed to ensure that a HA software instance is maintained and available, the RPD acts as master DOCSIS time for the active software component. The active software component is the master for the standby software component. The standby software component is the slave of the active software component.

Embodiments of the invention may also maintain a HA software instance using an approach where a RPD acts as a master clock to both active and standby pods, both of which lock to the RPD clock in parallel. Thus, in an embodiment, slave clocks at the core may lock to a single RPD master clock.

Extensions and Benefits

In embodiments of the invention, the RPD is running based on its own hardware clock (termed 'free running' in the art) and does not use PTP to synchronize its clock to any clock in the CCAP core or elsewhere in the cable network. However, in such embodiments, the cable modems may continue to synchronize their clocks to their upstream RPDs. In certain embodiments of the invention, a RPD may still synchronize its clock to the CCAP core clock using the PTP protocol if desirable; however, the CCAP core need not be informed that the RPD is doing so and would continue to perform the steps of FIG. 2 without the CCAP core using PTP itself.

In the prior art, the CCAP core server is required to support high accuracy hardware clocks located on the motherboard and the network interface card (NIC). The NIC is required to support the PTP1588 protocol and be able to stamp timestamps onto packets as they arrive (and sent to the software stack) or as they leave towards the GM. However, using embodiments of the invention, this requirement is no longer as the server has no special clock or PTP1588 protocol support requirements, although a standard motherboard oscillator is still required. An oscillator is used by a motherboard to convert DC signals to periodic AC signals which can be used to set frequency, be used for audio applications, or used as a clock signal.

Note that embodiments need not require the RPD to support the 1588PTP protocol or require the RPD to become a PTP1588 master. Using an embodiment of the invention, the RPD need only support the standard DLM protocol.

If a RPD is running PTP, then the RPD running PTP is forced to modify the frequency/phase of its internal clock. Because of these corrections made to the RPD clock, the CMs behind it may often accumulate timing offset corrections, which are compensated by periodic ranging process (typically 14 sec interval). Letting RPD work in 'free-run' mode without PTP should reduce these periodic timing offset corrections experienced by the CMs running behind the RPD clock in the network. Doing so should enable an increase in the periodic ranging interval and/or reduce the guard interval between upstream bursts. Also, another advantage of allowing the RPD to operate in 'free-run' node in this manner may provide an amount of additional upstream bandwidth and reduce the load on CCAP core due to less RNG-REQ messages to be processed.

Embodiments of the invention exhibit numerous benefits. For example, embodiment do not require the use of grand masters (GMs) or boundary clocks (BCs) to achieve the ability for different locations across a cable network or other DAA to send messages to each other in a timely manner. Also, as maintaining proper timing amongst the various clocks dispersed throughout the cable television network from a CCAP core to a customer's premises using embodiments of the invention is simpler as the use of PTP can be avoided, the magnitude and frequency of field issues, bugs, and development efforts are reduced.

The term "non-transitory computer-readable storage medium" as used herein refers to any tangible, physical medium that participates in persistently storing instructions or operational guidance which may be provided to a processor for execution. Additional details about the operation of non-transitory computer-readable storage mediums may be found within U.S. Pat. No. 11,212,590, issued Dec. 28, 2021, entitled "Multiple Core Software Forwarding," the entire contents of which are hereby incorporated by reference for all purposes as if fully set forth herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for tracking time differences between a master clock and a slave clock, which when executed, cause:

at a Converged Cable Access Platform (CCAP) core, tracking differences in clock values between a singular CCAP core clock and one or more remote-PHY device (RPD) clocks using clock values identified by received Downstream External PHY Interface (DEPI) Latency Measurement (DLM) packets and not using Precision Time Protocol (PTP) protocol;

determining a particular RPD clock value to use in sending a map message to a particular RPD; and sending the map message from the CCAP core to the particular RPD over a network based on said determined particular RPD clock value.

2. The non-transitory computer-readable storage medium of claim 1, wherein said determining said particular RPD clock value is performed using an estimate of network latency between said CCAP core and the particular RPD obtained using data obtained using DLM packets.

3. The non-transitory computer-readable storage medium of claim 1, wherein each of said one or more RPD clocks do not synchronize their clock values to clock values of any other clock.

4. The non-transitory computer-readable storage medium of claim 1, wherein determining a particular RPD clock value is performed using a measurement of network latency between said CCAP core and said particular RPD.

5. The non-transitory computer-readable storage medium of claim 1, wherein all of said one or more RPD clocks operate in a different clock domain than said singular CCAP core clock.

6. The non-transitory computer-readable storage medium of claim 1, wherein determining the particular RPD clock value comprises determining an estimate of network latency using two DLM Response packets sent by the particular RPD in response to two consecutive DLM Request packets.

7. The non-transitory computer-readable storage medium of claim 1, wherein determining the particular RPD clock value to use in sending the map message the particular RPD is performed using samples of a single offset value that represent (i) a measure of network latency and (ii) a clock phase offset between (a) said particular RPD clock and said singular CCAP core clock or (b) a clock used by software executing at said CCAP core and said particular RPD clock.

8. The non-transitory computer-readable storage medium of claim 1, wherein said determining said particular RPD clock value is performed using an estimate of network latency that is measured only in a downstream direction.

9. An apparatus for tracking time differences between a master clock and a slave clock, comprising:

one or more processors; and one or more non-transitory computer readable storage mediums storing one or more sequences of instructions, which when executed, cause:

at a Converged Cable Access Platform (CCAP) core, tracking differences in clock values between a singular CCAP core clock and one or more remote-PHY device (RPD) clocks using clock values identified by received Downstream External PHY Interface (DEPI) Latency Measurement (DLM) packets and not using Precision Time Protocol (PTP) protocol;

determining a particular RPD clock value to use in sending a map message to a particular RPD; and sending the map message from the CCAP core to the particular RPD over a network based on said determined particular RPD clock value.

10. The apparatus of claim 9, wherein said determining said particular RPD clock value is performed using an estimate of network latency between said CCAP core and the particular RPD obtained using data obtained using DLM packets.

11. The apparatus of claim 9, wherein each of said one or more RPD clocks do not synchronize their clock values to clock values of any other clock.

12. The apparatus of claim 9, wherein determining a particular RPD clock value is performed using a measurement of network latency between said CCAP core and said particular RPD.

13. The apparatus of claim 9, wherein all of said one or more RPD clocks operate in a different clock domain than said singular CCAP core clock.

14. The apparatus of claim 9, wherein determining the particular RPD clock value comprises determining an estimate of network latency using two DLM Response packets sent by the particular RPD in response to two consecutive DLM Request packets.

15. The apparatus of claim 9, wherein determining the particular RPD clock value to use in sending the map message the particular RPD is performed using a single offset value to that represents clock phase offset between said particular RPD clock and said singular CCAP core clock and an estimate of network latency between said CCAP core and the particular RPD as measured in only a downstream direction.

16. The apparatus of claim 9, wherein said determining said particular RPD clock value is performed using an estimate of network latency that is measured only in a downstream direction.

17. A method for tracking time differences between a master clock and a slave clock, comprising:

at a Converged Cable Access Platform (CCAP) core, tracking differences in clock values between a singular CCAP core clock and one or more remote-PHY device (RPD) clocks using clock values identified by received Downstream External PHY Interface (DEPI) Latency Measurement (DLM) packets and not using Precision Time Protocol (PTP) protocol;

the CCAP core determining a particular RPD clock value to use in sending a map message to a particular RPD; and the CCAP core sending the map message to the particular RPD over a network based on said determined particular RPD clock value.

18. The method of claim 17, wherein the CCAP core determining said particular RPD clock value is performed using an estimate of network latency between said CCAP core and the particular RPD obtained using data obtained using DLM packets.

19. The method of claim 17, wherein each of said one or more RPD clocks do not synchronize their clock values to clock values of any other clock.

20. The method of claim 17, wherein determining a particular RPD clock value is performed using a measurement of network latency between said CCAP core and said particular RPD.

21. The method of claim 17, wherein all of said one or more RPD clocks operate in a different clock domain than said singular CCAP core clock.

22. The method of claim 17, wherein the CCAP core determining the particular RPD clock value comprises determining an estimate of network latency using two DLM Response packets sent by the particular RPD in response to two consecutive DLM Request packets.

23. The method of claim 17, wherein the CCAP core determining the particular RPD clock value to use in sending the map message the particular RPD is performed using a single offset value to that represents clock phase offset between said particular RPD clock and said singular CCAP core clock and an estimate of network latency between said CCAP core and the particular RPD as measured in only a downstream direction.

24. The method of claim 17, wherein said determining said particular RPD clock value is performed using an estimate of network latency that is measured only in a downstream direction.

\* \* \* \* \*